May 5, 1970 P. LAUPER 3,510,695

APPARATUS PROVIDING CONSTANT ADJUSTMENT OF THE PARTIAL CURRENT IN A NONLINEAR RESISTANCE NETWORK

Filed July 6, 1967

INVENTOR.
PAUL LAUPER
BY
McGlew & Toren
ATTORNEYS

United States Patent Office 3,510,695

Patented May 5, 1970

3,510,695

APPARATUS PROVIDING CONSTANT ADJUSTMENT OF THE PARTIAL CURRENT IN A NON-LINEAR RESISTANCE NETWORK

Paul Lauper, Fribourg, Switzerland, assignor to Maschinenfabrik Oerlikon, Zurich, Switzerland Filed July 6, 1967, Ser. No. 651,514

Claims priority, application Switzerland, July 6, 1966, 9,988/66

Int. Cl. H03k *1/00, 1/02, 1/12*

U.S. Cl. 307—296 3 Claims

ABSTRACT OF THE DISCLOSURE

A non-linear resistance network is part of apparatus providing for constant adjustment of the partial current therein. An input current line and an output current line are connected by a pair of branch circuits each having a partial current flowing therethrough, with the non-linear resistance network being connected in one branch circuit and with a transistor having its collector-emitter circuit connected in the other branch circuit and its base connected to the one branch circuit.

The transistor controls the current distribution in the two branches, so that the ratio of the partial current, in the non-linear resistance network, to the input current is maintained constant.

An adjustable resistance is connected in series in each branch circuit, and the partial currents in the two branch circuits are inversely proportional to the adjustable resistances therein. A diode may be connected in series with the non-linear resistance network to match the relatively small voltage drop in the base-emitter circuit of the transistor. Alternatively, a second transistor can have its collector-emitter circuit connected in series with the non-linear resistance network, and its base connected to the base of the first-mentioned transistor. In this case, the control current for the two transistors is supplied through a further resistor connected between the input current line and the line connecting the bases of the two transistors.

Background of the invention

Electrical protection and regulating arrangements sometimes use components in which the relation between the voltage and the current is non-linear. This is particularly true in the case in which the current is known and a voltage, which has a defined non-linear relationship to the current, is needed to provide output signals for control and regulating components. Such switching elements are provided, in a known manner, as non-linear resistance networks, and may include semi-conductors such as Zener diodes or a combination of Zener diodes and linear resistors. Normally, they are designed to produce a voltage drop which is a certain function of the current flowing through the switching element.

An additional adjustment possibility often is required so that the voltage value U assigned to each current value I can be adjusted within certain limits without changing the course of the function representing the relation between the voltage and the current. In other words, the function $U=f(KI)$ must be simulated, the factor K being one which is independent of U and I, or which is adjustable. The adjustment possibility therefore should have the same effect as a variable current transformation at the input end of the non-linear resistance network.

A typical example for the use of such a switching element is a maximum current-time relay with a current-dependent trip delay. In this case, the time component is influenced by a current-dependent voltage, which results in the desired non-linear characteristic. Further than this, the characteristic should be independent of the respective preset response value of the relay.

For the above purpose, it is known to branch off a part of the current through a variable resistor connected in parallel to the non-linear switching element. In order that the reaction of the non-linear resistance characteristic will not influence the branch current in the parallel resistor, the non-linear member must be preceded by a high value linear resistor. As a result, the energy absorption of the overall device often increases to impermissible values.

When the power source is a rectifier supplied by a current transformer, it is also known to modify the transmission ratio of the transformer by means of primary and secondary taps. A major disadvantage of this arrangement, apart from its complications, is that constant adjustment is not possible.

Summary of the invention

The present invention is directed to an electronic device for adjusting the partial current in a non-linear resistance network in such a manner that, independent of the adjustment and the magnitude of the input current, the ratio of input current to the partial current in the non-linear network remains constant. In addition to providing infiinite variability, the arrangement of the present invention is characterized by its very small energy consumption compared to known prior art devices.

In accordance with the invention, at least a pair of branch circuits are connected between a current input line and a current output line, with a non-linear network being included in one branch circuit and with a transistor having its output circuit connected in the other branch circuit and its circuit controlled by the partial current through the non-linear network. The transistor thus controls the current flowing through its branch circuits, to maintain the ratio of the partial current, in the non-linear resistance network, to the input current at a constant value.

To compensate for the relatively small voltage drop between the base and the emitter of the transistor, a diode or a second transistor may be connected in the branch circuit in series with the non-linear resistance network, the bases of the transistors being connected to each other and being commonly controlled by a controlled current flowing through a resistor connected to the input current line.

An object of the invention is to provide apparatus for constant adjustment of the partial current in a non-linear resistance network.

Another object of the invention is to provide such an apparatus which is characterized by very low energy consumption.

A further object of the invention is to provide such an apparatus in which the ratio of input current to the partial current through the non-linear network is infinitely variable.

Still another object of the invention is to provide such an apparatus including a pair of branch circuits, one having the non-linear resistance network connected therein and the other having a transistor connected therein and controlled by the partial current through the non-linear resistance network.

A further object of the invention is to provide such an apparatus including a diode in series with the non-linear resistance network to compensate for the relatively small voltage drop between the base and emitter of the transistor.

Yet another object of the invention is to provide such an apparatus including a second transistor connected in series with the non-linear resistance network, the bases of the two transistors being connected to each other and commonly supplied with a control current from the current input line.

A further object of the invention is to provide such an apparatus which is simple, inexpensive, uses known control elements, and is highly effective in operation.

Brief description of the drawings

For an understanding of the principles of the invention, reference is made to the following description of typical embodiments thereof as illustrated in the accompanying drawings.

In the drawings.

Description of the preferred embodiments

Figure 1:
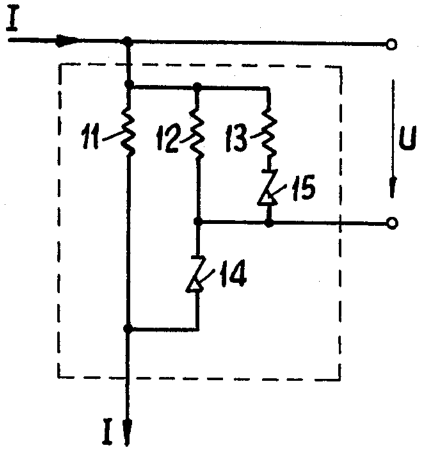
FIG. 1 is a schematic wiring diagram of a typical non-linear resistance network.

FIG. 1 illustrates a typical example of a non-linear resistance network, in which a resistor 11 and a Zener diode 14 serve for shifting the zero point of the output voltage U as a function of the input current I. Thus, the voltage drop across resistor 11 is substantially completely absorbed by Zener diode 14 until the Zener diode voltage of the latter is obtained. The actual non-linear characteristic is adjustable by means of resistors 12 and 13 and a second Zener diode 15.

Figure 2:
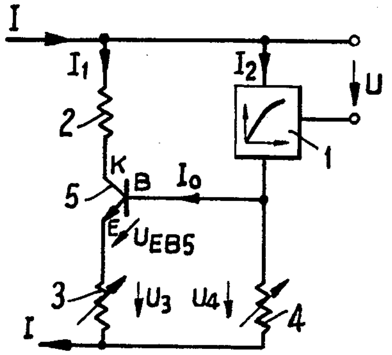
FIG. 2 is a schematic wiring diagram of one form of apparatus embodying the invention.

Referring to FIG. 2, I is the input current of the device, and the non-linear resistance network is indicated at 1 as providing the output voltage U. A fixed linear resistor is indicated at 2, and variable resistors are indicated at 3 and 4, these resistors being used to adjust the current ratio in the branches interconnecting the input current line and the output current line, which are indicated by arrows thereon. A transistor 5 is illustrated as having its collector K connected to fixed linear resistor 2 and its emitter E connected to adjustable resistors 3. The base B of transistor 5 is connected to the branch circuit including the non-linear resistance network 1 in series with the adjustable resistor 4.

Figure 3:
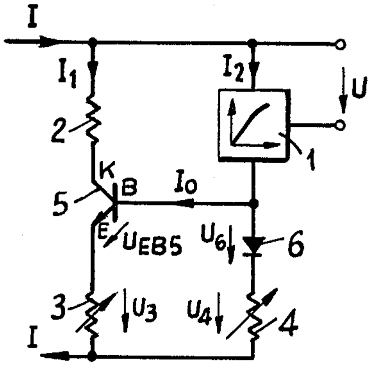
FIGS. 3 and 4 are schematic wiring diagrams of variations of the embodiment of the invention shown in FIG. 2, and which have improved temperature behavior and accuracy.

The embodiment shown in FIG. 3 differs from that shown in FIG. 2 in that an additional semi-conductor diode 6 is connected in series between non-linear resistance network 1 and adjustable resistor 4.

Figure 4:
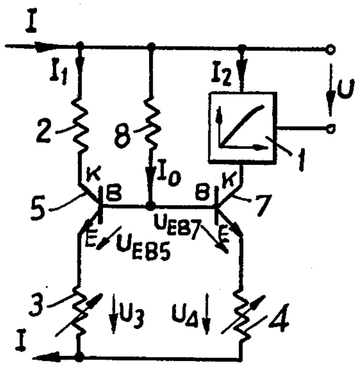

In the embodiment of the invention shown in FIG. 4, the diode 6 is replaced by a transistor 7 having its base B connected to the base B of transistor 5, its collector K connected to non-linear resistance network 1, and its emitter E connected to adjustable resistor 4. A resistor 8 is connected between the input current line and the bases B, B of transistors 5 and 7 to control these transistors.

The operating mode of the apparatus of the invention will be explained with particular reference to FIG. 2. The total current I is divided into two branch currents $I_1$ and $I_2$, flowing into each of the two parallel branch circuits interconnecting the input current line and the output current line. The control current $I_0$ of transistor 5, which flows in the cross branch or connection, is normally very small. For this reason, it can virtually be neglected as compared to the two branch currents $I_1$ and $I_2$. Therefore, it can be assumed with good approximation that branch current $I_1$ flows through resistor 3 and branch current $I_2$ flows through resistor 4.

Due to the cross branch connected to base B of transistor 5, currents $I_1$ and $I_2$ now adjust themselves so that the voltage drop across resistor 4 ($U_4$) is equal to the sum of the voltage drop across resistor 3 ($U_3$) and across the base-emitter circuit of transistor 5 ($U_{EB5}$). Since the latter value is small, it may be approximated that the voltage drops $U_3$ and $U_4$ are equal, or that the ratio of the partial currents $I_1$ and $I_2$ is inversely proportional to the ratio of the resistors 3 and 4.

Resistor 2 serves to reduce the power loss of transistor 5, but is not essential for the basic operation of the apparatus. The difference between the voltage drop across resistor 2 and the voltage drop across non-linear resistance network 1 is automatically equalized due to the corrective effect of the control current $I_0$ of transistor 5 through the voltage drop across the collector-emitter circuit of the transistor 5.

The current distribution in the two branches and, therefore, the relationship between the total current I and the branch current $I_2$ of the non-linear resistance network 1 is thus practically independent of the resistance course of the latter, and is given substantially solely by the ratio of the linear resistors 3 and 4. The ratio thus can be infinitely adjusted by adjusting one or the other of resistors 3 and 4.

The error caused by the voltage drop $U_{EB5}$ across the base-emitter circuit of transistor 5, while small, interferes with exact applications. Inasmuch as the base-emitter sector of transistor 5 has a resistance corresponding to the resistance course of a diode, the small voltage drop can be compensated very substantially by the voltage drop across diode 6 in the branch containing the non-linear network 1, and is shown in FIG. 3.

For even more exact compensation, a second transistor 7, whose voltage drop across its base-emitter sector ($U_{EB7}$) can be matched exactly to that of transistor 5 ($U_{EB5}$), can be substituted for diode 6, as shown in FIG. 4. In this case, the control current $I_0$ of the two transistors 5 and 7 must be supplied from the input current line through the separate resistor 8.

The operating mode of the circuit shown in FIGS. 3 and 4 is the same, in principle, as explained with respect to FIG. 2. However, in the circuit shown in FIG. 4, the adaptation of the voltage drops of the two branches is effected, in dependence on the layout of resistor 2 and the input current I, by transistors 5 or 7. This design offers the additional advantage that it can be expanded analogously for several parallel branches.

While specific embodiments of the invention have been shown and described in detail to illustrate the application of the principles of the invention, it will be understood that the invention may be embodied otherwise without departing from such principles.

What is claimed is:

1. Apparatus providing adjustment of the factor K, of the function $U=f(KI)$ predetermined by a non-linear network including input and output lines, a first resistor and a first series connection, of a first Zener diode and a second resistor, connected in parallel between the input and output lines of the network, and a second series connection, of a second Zener diode and a third resistor, shunting the second resistor, and in which the voltage U is an output voltage tapped across the second series connection and the current I is the input current supplied to the network: said apparatus comprising, in combination, a transistor having a collector, a base, an emitter and a collector-base branch, said collector-base branch being connected, in parallel with said first resistor and said first series connection, between said input and output lines of said network; a fourth resistor having one terminal connected to said emitter and a second terminal, remote from said one terminal, which is the current output of said apparatus. and a fifth resistor connected directly between said current output of said apparatus and said output line of said network; at least one of said fourth and fifth resistors being adjustable in value for providing adjustment of the factor K.

2. Apparatus as claimed in claim 1, including a diode connected in series between said output line of said non-linear network and said fifth resistor.

3. Apparatus as claimed in claim 1, including a second transistor having a collector, a base and an emitter; said collector of said second transistor being connected to the output line of said non-linear network; said base of said second transistor being directly connected to the base of the first-mentioned transistor; a sixth resistor connecting said input line of said non-linear network commonly to the bases of the first-mentioned transistor and said second transistor; said emitter of said second transistor being connected, in series with said fifth resistor, to said current output of said apparatus.

References Cited

UNITED STATES PATENTS

| | | | |
|---|---|---|---|
| 2,697,201 | 12/1954 | Harder | 323—66 |
| 2,751,550 | 6/1956 | Chase | 307—318 XR |
| 3,339,114 | 8/1967 | Kelley et al. | 307—318 XR |

DONALD D. FORRER, Primary Examiner

J. ZAZWORSKY, Assistant Examiner

U.S. Cl. X.R.

307—229, 318; 323—1